(12) United States Patent
Mösslein et al.

(10) Patent No.: US 10,315,127 B2
(45) Date of Patent: Jun. 11, 2019

(54) DISTILLATION SYSTEM

(71) Applicant: GEA Wiegand GmbH, Ettlingen (DE)

(72) Inventors: Monika Mösslein, Ettlingen (DE); David Scheiby, Solihull (GB)

(73) Assignee: GEA WIEGAND GMBH, Ettlingen (DE)

( * ) Notice: Subject to any disclaimer, the term of this patent is extended or adjusted under 35 U.S.C. 154(b) by 135 days.

(21) Appl. No.: 15/522,918

(22) PCT Filed: Oct. 27, 2015

(86) PCT No.: PCT/EP2015/074824
§ 371 (c)(1),
(2) Date: Apr. 28, 2017

(87) PCT Pub. No.: WO2016/066622
PCT Pub. Date: May 6, 2016

(65) Prior Publication Data
US 2017/0312649 A1    Nov. 2, 2017

(30) Foreign Application Priority Data
Oct. 29, 2014   (DE) .................. 10 2014 222 071

(51) Int. Cl.
*B01D 3/02* (2006.01)
*B01D 3/00* (2006.01)
(Continued)

(52) U.S. Cl.
CPC .............. *B01D 3/003* (2013.01); *B01D 3/007* (2013.01); *B01D 3/02* (2013.01); *B01D 3/42* (2013.01); *C12H 6/02* (2019.02)

(58) Field of Classification Search
CPC .......... B01D 3/003; B01D 3/007; B01D 3/02; B01D 3/42; C12G 3/12
See application file for complete search history.

(56) References Cited

U.S. PATENT DOCUMENTS 4,539,076 A * 9/1985 Swain .................. B01D 1/2856
202/154
4,695,349 A * 9/1987 Becker .................. B01D 3/007
159/17.3
(Continued)

FOREIGN PATENT DOCUMENTS

DE        19650163        5/1998
DE   10 2006 049 175      6/2008
(Continued)

OTHER PUBLICATIONS

International Search Report of PCT/EP2015/074824 dated Apr. 29, 2016, 10 pages (English and German).
(Continued)

*Primary Examiner* — Jonathan Miller
(74) *Attorney, Agent, or Firm* — Rankin, Hill & Clark LLP

(57) ABSTRACT

A pot distillation system, in particular for whiskey, includes a distillation bubble with a base equipped to heat an alcoholic liquid, and a top removing alcohol vapors. The alcoholic liquid in the base is heated by a heating unit having a heat exchanger which is in thermal contact with the alcoholic liquid and heated by water vapor. A condenser having a cooling water circuit recirculating cooling water across the condenser condenses the alcohol vapor supplied from the top. The cooling water circuit includes a separator which removes water vapor from the cooling water circuit. The water vapor removed by the separator is pre-compressed in a mechanical compressor and supplied to an intake port of a steam jet pump which is driven by water vapor from a water vapor source and which further compresses the pre-compressed water vapor, and the steam jet pump supplying the further compressed water vapor to the heat exchanger for heating same.

11 Claims, 1 Drawing Sheet

(51) Int. Cl.
    *B01D 3/42*     (2006.01)
    *C12H 6/02*     (2019.01)

(56) References Cited

U.S. PATENT DOCUMENTS

| | | | | |
|---|---|---|---|---|
| 4,961,826 | A * | 10/1990 | Grethlein | B01D 1/2856 202/154 |
| 5,124,004 | A * | 6/1992 | Grethlein | B01D 1/2856 202/154 |
| 5,252,187 | A * | 10/1993 | Ohtsu | B01D 1/26 159/24.2 |
| 5,294,304 | A * | 3/1994 | Kano | C07C 29/84 203/19 |
| 7,867,365 | B2 * | 1/2011 | Brown | B01D 3/002 159/2.1 |
| 8,425,733 | B2 * | 4/2013 | Halvorsen | B01D 3/004 203/19 |
| 10,022,648 | B2 * | 7/2018 | Maedebach | B01D 3/007 |
| 2010/0270139 | A1 * | 10/2010 | Halvorsen | B01D 3/004 203/19 |

FOREIGN PATENT DOCUMENTS

| | | |
|---|---|---|
| DE | 10 2007 020 786 | 11/2008 |
| DE | 102007020786 | 11/2008 |
| DE | 102011082513 | 3/2013 |
| EP | 0049584 | 4/1982 |
| FR | 2570285 | 3/1986 |
| WO | 198102088 | 8/1981 |
| WO | 2008046633 | 4/2008 |
| WO | 2008046634 | 4/2008 |

OTHER PUBLICATIONS

Schiffmann et al.: "High-Speed Low Power Radial Turbocompressor for Oil-Free Heat Pumps", International Compressor Engineering Conference at Purdue, Jul. 17, 2006, docs.lib.purdue.edu/cgi/viewcontent.cgi?article=2827&context=icec, 9 pages.

Kane, J.: "Turbochargers: How They Work, and Current Turbo Technology by EPI Inc.", Nov. 1, 2008, http://www.epi-eng.com/piston_engine_technology/turbocharger_technology.htm.

Kiss, Anton A., et al.; Towards energy efficient distillation technologies—Making the right choice, available online Oct. 22, 2012 (journal homepage: www.elsevier.com/locate/energy).

Hanggi, Daniel, et al.; Vapor Recompression: Distillation Without Steam, Sulzer Technical Review, Jan. 1999.

Centenary 2012 Scotch Whisky Association; Scotch Whisky Industry Environmental Report 2012.

Outland, James S., et al.; Applications of Mechanical Vapor Recompression to Evaporation and Crystallization, Proceedings from the Seventeenth Industrial Energy Technology Conference, Houston, TX Apr. 5-6, 1995.

Annakou, Omar, et al.; Rigorous Investigation of Heat Pump Assisted Distillation, Department of Chemical Engineering, Technical University of Budapest, Hungary, Apr. 8, 1994.

GEA Wiegand GMBH; Evaporation Technology using Mechanical Vapour Recompression.

* cited by examiner

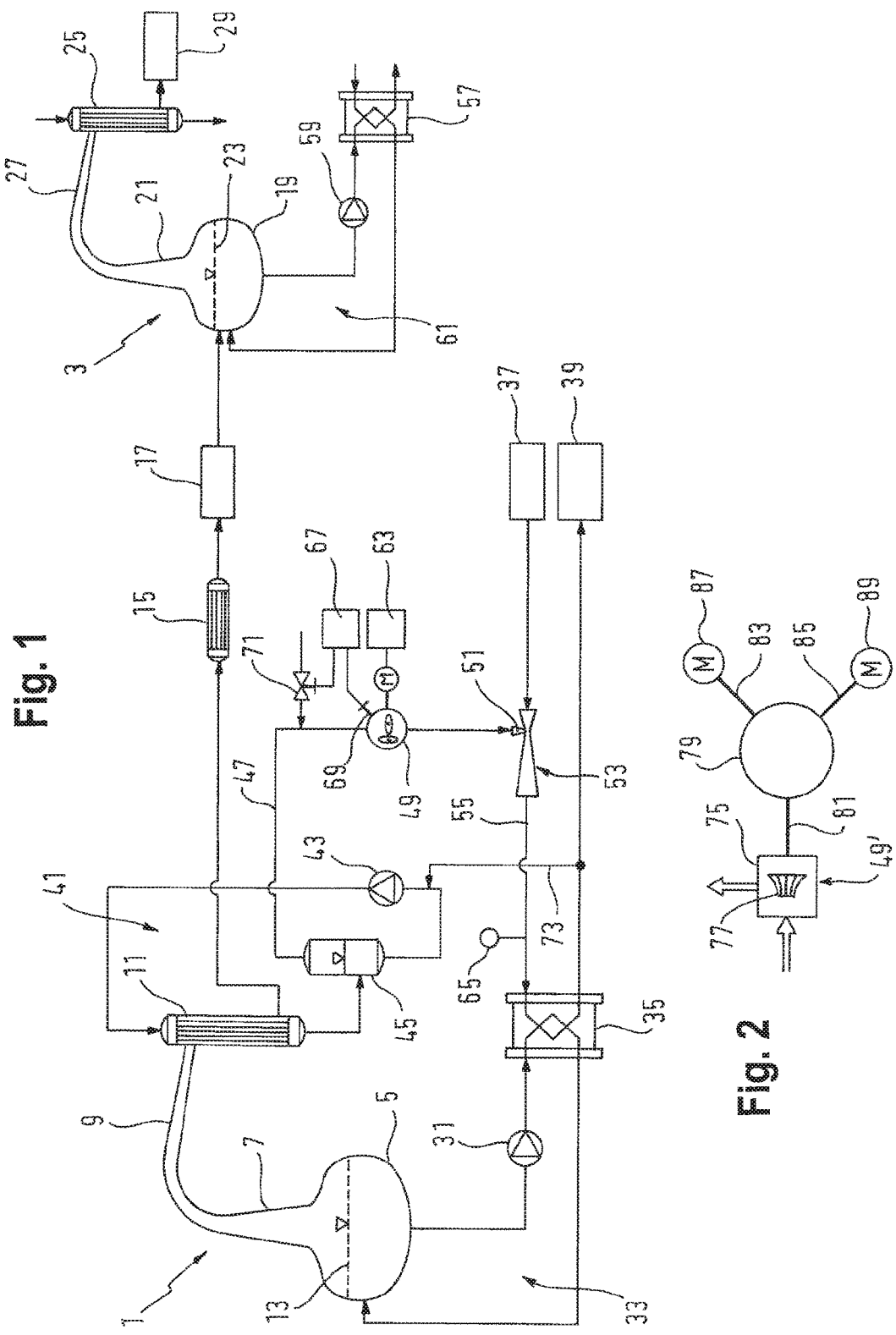

DISTILLATION SYSTEM

BACKGROUND

The invention relates to a distillation system, in particular a pot still distillation system, preferably for potable alcohol and specifically, whiskey.

BRIEF DESCRIPTION

Even though potable alcohol can also be separated into fractions in continuously operating distillation systems, distillation in portions in pot still distillation systems is used to a large extent for some types of potable alcohol, especially, however, for whiskey. In the pot stills, which largely consist of copper, the wort, which has been fermented to make an alcoholic liquid (wash) by adding yeast, is heated up in a tank-like base of the pot still, whereby alcohol vaporises out of the fermented liquid. The base of the pot still is covered by a conical top and connected to a condenser, which condenses alcohol vapour rising out of the base.

Normally, whiskey is distilled in at least two pot stills arranged in succession. In addition to the raw alcohol, the fermented liquid (wash) to be distilled in a first pot still (wash still) still contains yeast and some unfermentable substances and by-products of the fermentation. When boiled, the fermented liquid changes in a manner that is of crucial importance to the flavour and character of the whiskey. The special characteristic of pot still distillation is that the condensation does not take place only in the condenser in such a distillation system, but also on the walls of the pot still, in particular on its top and the arm connecting it to the condenser (lyne arm) that is normally attached to said top. The (partial) condensation of the alcoholic vapour and the associated separating effect of the pot still, which is promoted by absorption and desorption processes on the copper of which the whole system mostly consists, have a major influence on the quality of the whiskey.

The condensate emerging from the condenser of the first distillation stage (low wines) is fed into a second distillation pot still (spirit still) for a second distillation stage, in which second distillation pot still the condensate is separated, during distillation, into three fractions, namely the foreshot, the potable alcohol and the feint. While the potable alcohol forms the end product, which might still be blended, when using just two distillation stages, the foreshot and the feint are introduced back into the distillation process when the second distillation pot still is next filled. It should be understood that the distillation can also take place in more than two distillation stages, in particular in three distillation stages. In the case of these repeated distillation stages, the potable alcohol is free from sediments.

The energy required by the distillation pot still in the first distillation stage (wash still) is conventionally supplied by live water vapour and the amount of energy required is comparatively high. Energy recovery is not readily possible since the evaporation temperature in the distillation pot still rises with increasing alcohol depletion of the alcoholic liquid in the pot still, just as the condensation temperature of the alcoholic vapours rises. A control system is not desirable since every change in the process parameters can have an influence on the quality of the whiskey being produced.

A multi-stage pot still distillation system for spirits is known from FR 2 970 479, in which a first distillation pot still is operated under pressure and a second distillation pot still is operated under vacuum. Alcoholic vapours from the first distillation pot still are supplied via a first heat exchanger to a live-steam-operated steam jet pump, which supplies a second heat exchanger which is intended to heat the first pot still distillation stage.

The object of the invention is to provide a pot still distillation system which is suitable for the distillation of whiskey in particular, which allows the external energy required for the distillation, in particular the live steam requirement, to be reduced without this having to have an undesirable effect on process parameters of the distillation, which affect quality parameters of the potable alcohol, in particular of the whiskey.

The invention is based on a pot still distillation system, in particular for whiskey, which comprises:

a distillation pot still comprising a base set up to heat an alcoholic liquid, and a top which removes alcoholic vapours, a heating device which heats up the alcoholic liquid in the base and has a heat exchanger which is in thermal contact with the alcoholic liquid and is heated by water vapour, and a condenser which condenses the alcoholic vapour supplied from the top and has a cooling water circuit which circulates cooling water across the condenser.

The object described above is achieved according to the invention in that the cooling water circuit comprises a separator which removes water vapour from the cooling water circuit and in that a mechanical compressor precompresses the water vapour removed by the separator and supplies said vapour to an intake port of a steam jet pump which is driven by water vapour from a water vapour source and which post-compresses the pre-compressed water vapour, said steam jet pump supplying the post-compressed water vapour to the heat exchanger for heating same.

In such a pot still distillation system, some of the energy supplied to heat said system is recovered entirely from the energy conducted away from the condenser via the cooling water circuit. The balance of the energy required to heat the distillation pot still comes from the water vapour source. The path of the alcoholic vapour in the top of the distillation pot still or condenser does not have to be interfered with and accordingly, the condensation which determines quality is essentially not influenced either.

The mass flow of water vapour, which is supplied to the heat exchanger to heat the distillation pot still, is expediently substantially constant in order to prevent quality changes to the whiskey. In a preferred embodiment, a control system is provided for this purpose, which adjusts the speed of a drive motor of the mechanical compressor. In this manner, the intake pressure of the mechanical compressor and the outlet pressure of the steam jet pump which performs post-compression can be reduced as the alcohol concentration of the fermented wort heated up in the distillation pot still decreases, in order to be able to heat with a substantially constant mass vapour flow over the course of the distillation.

The mechanical compressor is preferably speed-controlled. In this connection, it has proven expedient for the temperature of the mechanical compressor, in particular of its housing, to be operated simultaneously in a predetermined temperature range. If the housing is too cold, it can lead to corrosion damage, whereas if it is overheated, the mechanical compressor can become thermally damaged. This applies, in particular, if the mechanical compressor is a rotary blower which is intended to be operated expediently in a temperature range of 120-150° C. In a preferred embodiment, the temperature range is maintained by means of a temperature control system using the injection of water into the intake flow of the mechanical compressor or rotary blower.

The energy requirement of the distillation pot still can be reduced largely without any loss of quality of the distilled whiskey if the mechanical compressor increases the absolute pressure of the pre-compressed water vapour in relation to the absolute pressure at the separator by a factor of 2 to 3, and/or increases the temperature of the pre-compressed water vapour to more than 100° C. Accordingly, it is advantageous if the steam jet pump increases the absolute pressure of the post-compressed water vapour in relation to the absolute pressure of the pre-compressed water vapour by a factor of 1.1 to 1.4, in particular 1.2 to 1.3, and/or increases the temperature of the postcompressed water vapour in relation to the temperature of the pre-compressed water vapour by a factor of 1.05 to 1.3, in particular by a factor of 1.1 to 1.25. The above values apply in particular if the speed of the mechanical compressor is at least 60,000 1/min (RPM), as described below.

The mechanical compressor is preferably a rotary blower or a roots blower or a turbo compressor. The rotary blower and also the steam jet pump constitute "volumetric flow conveyors", which convey a constant volumetric flow in a first approximation, and specifically substantially irrespective of the intake pressure. The system consisting of the rotary blower and steam jet pump can be controlled in an open-loop or closed-loop manner, expediently in this manner in terms of a constant mass vapour flow. In addition, rotary blowers are relatively inexpensive. When using a turbo compressor, its speed is preferably more than 20,000 1/min (RPM), in particular more than 60,000 1/min (RPM) and preferably at least 90,000 1/min (RPM).

Conventional turbo compressors, as used for energy recovery in distillation or vaporising systems, are relatively expensive. They usually comprise a housing, welded together from sheet metal blanks, and their compressor wheel is also welded together from individual parts. The costs can be reduced considerably if the turbo compressor comprises a housing designed as a cast metal part and a compressor wheel designed as a milled part which is driven by an electric motor using a gear system, in particular a planetary gear system. Such components can be provided cost-effectively, provided their dimensions are relatively small. Such turbo compressors still supply a sufficiently high mass flow rate if they operate at a speed of at least 60,000 1/min (RPM), preferably at least 90,000 1/min (RPM), as described above. When using turbo compressors of this kind, compressor units can be reverted to, such as those used in large numbers at relatively low cost as "turbochargers" in internal combustion engines.

The concept described above, of using the compressor unit of a "turbocharger" of an internal combustion engine as the mechanical compressor of a distillation system, can be used advantageously not only for the pot still distillation system described above but also for distillation systems or vaporising systems of a general nature. The concept therefore also has independent inventive importance, in particular in the case of a distillation system having a distillation apparatus which removes a liquid having a low boiling point, in particular alcohol, from a blend of liquids formed by a plurality of liquids having different boiling points, in particular from a fermented blend of liquids, which distillation apparatus has a mechanical compressor for increasing the pressure and/or the temperature of steam or vapours in the distillation system. It is also preferably provided in this distillation system for the mechanical compressor to have a compressor wheel which is driven at a speed of 90,000 1/min (RPM) or more. The mechanical compressor is driven by one, if applicable even by more than one, electric motor, which drives the compressor wheel via a gear system, in particular an epicyclic gear system, specifically a planetary gear system. The planetary gear system has at least three gear elements which are coaxial with one another and are rotatable relative to one another about a common axis: sun gear, ring gear and planet carrier for planet gears connected to the sun gear and the ring gear. One feature of the planetary gear is that rotary power supplied to two of said gear elements is transferred to the third gear element additively or subtractively, relative to the speed and/or torque. In a preferred embodiment, it is therefore provided for the compressor wheel to be connected to one of the gear elements of the planetary gear system while one of the two other gear elements is connected to the electric motor, preferably each of the two other gear elements is connected to separate electric motors. When the gear element connected to the compressor wheel, for example, the sun gear, is selected appropriately, the speeds of the two electric motors can be superimposed on one another additively. This concept is also of particular advantage for the pot still distillation system described above.

BRIEF DESCRIPTION OF THE DRAWINGS

The invention is described in more detail below with reference to a drawing, in which FIG. 1 shows a pot still distillation system for whiskey, and FIG. 2 is a schematic view of a mechanical compressor, as can be used in the distillation system in FIG. 1.

DETAILED DESCRIPTION

FIG. 1 shows a pot still distillation system for whiskey having two distillation pot stills 1, 3 distilling an alcoholic liquid in portions in two successive distillation stages. The distillation pot still 1 (wash still), which is assigned to the first distillation stage, consists of copper and has a base 5, which is covered at the top by a helmet-like, tapering top 7 and is connected to a condenser 11 by means of an arm 9 (lyne arm), which condenser condenses the alcoholic vapours which rise up when the alcoholic liquid 13 located in the base is heated. The alcoholic liquid 13 is fermented wort (wash), which is heated up in a manner described below, and the vapours of which condense on the top 7, the arm 9 and in the present case, on external surfaces of a bundle of pipes, likewise consisting of copper, of the condenser 11. The condensate (low wines) of the first distillation stage is supplied via a cooler 15 to a storage tank 17 from which the distillation pot still 3 for the second distillation stage is filled in portions. The second distillation pot still 3 (spirit still) is similar to the first distillation pot still 1 and preferably likewise consists of copper and comprises a base 19, a top 21 and an arm 27 which supplies a condenser 25 with alcoholic vapours rising out of the alcoholic condensate 23 heated in the base 19. The distillation pot still 3 supplies three fractions, of which the foreshot, as the first fraction, and the feint, as the third fraction, are introduced back into the process when the distillation pot still 3 is next filled in order to be distilled again, while the second fraction, as the potable alcohol, namely whiskey, is supplied to a storage tank 29.

The fermented wort in the first distillation pot still 1 circulates, in a manner driven by a circulation pump 31, in a forced circuit 33 through a heat exchanger 35, which is supplied with water vapour from a live steam source 37 in a manner described below for heating the alcoholic liquid of the distillation pot still 1. Condensate occurring as water in the heat exchanger 35 is drawn off at 39 and returned to the live steam source 37 for further heating.

The condenser 11 is cooled by cooling water, which is conducted in a forced circuit 41, the circulation pump of which is shown at 43, through a separator 45, which removes the water vapour forming in the condenser 11 from the cooling water circulating in the circuit 41 and supplies said water vapour via a line 47 to a mechanical compressor, in particular a rotary blower 49. The rotary blower 49 supplies pre-compressed water vapour to an intake port 51 of a steam jet pump 53 acting as a thermal compressor, which steam jet pump in turn is operated by live steam from the live steam source 37, and supplies water vapour which is post-compressed at 55 to the heat exchanger 35 for heating the distillation pot still 1.

The mechanical compressor can also be a roots blower or a turbo compressor. The turbo compressor is expediently operated at a speed greater than 20,000 1/min (RPM), however preferably greater than 60,000 1/min (RPM), in particular at least 90,000 1/min (RPM). In the present embodiment, the heat exchanger 35 is arranged outside of the distillation pot still 1 and is in thermal contact with said distillation pot still via the forced circuit 33. It should be understood that the heat exchanger 35 can also be arranged inside the distillation pot still for direct thermal contact, in which case the forced circuit 33 is omitted.

The second distillation pot still 3 is likewise heated by live water vapour via a heat exchanger 57, by means of which the alcoholic condensate 23 is circulated in a forced circuit 61 in a manner driven by a circulation pump 59. Here too, the heat exchanger 57 can be arranged inside the distillation pot still 3, the forced circuit 61 thus being omitted, and can be in direct thermal contact with the condensate 23.

In order to achieve consistent quality of the whiskey, the distillation pot still 1 should be heated at an at least approximately constant mass vapour flow at the heat exchanger 35. However, the condensation properties of the condenser 11 change over the course of the distillation process and therefore so too does the pressure on the intake side of the mechanical compressor, in this case the rotary blower 49. In a typical distillation process, the pressure on the intake side of the mechanical compressor rises, for example, by −500 mbar(g) during vaporisation of fermented wort having a high alcohol concentration and low condensation temperature and up to as much as −300 mbar(g) during vaporisation of fermented wort having only low alcohol content. At the same time, however, the required output pressure of the thermal condenser, i.e. of the steam jet pump 53, would increase from 200 mbar(g) to approximately 300 mbar(g), unless it was ensured elsewhere that the heat exchanger 35 could be heated at a substantially constant mass vapour flow.

In order to achieve a substantially constant mass vapour flow, the motor speed of the rotary blower 49 is reduced over the course of the distillation process by means of a control system 63 according to the reduction in alcohol concentration of the fermented wort. The reference variable of the control system 63 can be the alcohol content of the alcoholic liquid 13 which is heated in the distillation pot still 1; other parameters could, however, also be used for managing the speed control, for example, the mass vapour flow rate at the inlet of the heat exchanger 35 or the temperature and/or pressure at the inlet of the heat exchanger 35, as indicated by a sensor 65.

In order to ensure properties of the energy recovery which are as consistent as possible on the one hand, and to prevent temperature-related damage to the rotary blower 49 on the other hand, the housing temperature of the rotary blower 49 is kept constant within a predetermined temperature range of, for example, 120 to 150° C. by means of a temperature control system 67. The temperature control system 67 detects the housing temperature by means of a temperature sensor 69 and controls the injection of water into the intake flow of the rotary blower 49 by means of a valve 71.

In order to compensate for water losses in the forced cooling water circuit 41 owing to the water vapour which is removed via the separator 45 for energy recovery, water is returned into the forced circuit 41 via a line 73, which is optionally valve-controlled, from the water-condensate side of the heat exchanger 35.

The rotary blower 49 increases the absolute pressure of the pre-compressed water vapour at the intake port 51 of the steam jet pump 53 relative to the absolute pressure at the separator 45 by a factor of 2 to 3. The temperature of the pre-compressed water vapour is preferably increased in this case to more than 100° C.

The steam jet pump 53 increases the absolute pressure of the post-compressed water vapour at the inlet of the heat exchanger 35 relative to the absolute pressure of the pre-compressed water vapour at the intake port 51 of said pump by a factor of 1.1 to 1.4, preferably 1.2 to 1.3. The temperature of the post-compressed water vapour is increased in this case relative to the temperature of the pre-compressed water vapour by a factor of 1.05 to 1.3, preferably by a factor of 1.1 to 1.25.

In a typical embodiment, there is a pressure of 1 bar(a) in the first distillation pot still at a temperature of 92 to 97° C. At the cooling water outlet of the condenser 11, the pressure is 0.5 to 0.65 bar(a) at a temperature of between 81 and 88° C. The rotary blower 49 supplies pre-compressed water vapour, for example at a pressure of 1 bar(a) and a temperature of 102 to 106° C. The vapour jet pump 53 is operated by live steam from the live steam source at approximately 12 bar and increases the pressure of the post-compressed water vapour to approximately 1.2 to 1.3 bar(a) at a temperature of approximately 120° C.

In the case of the conventional structure of a mechanical compressor 49 designed as a turbo compressor, the dimensions of the turbo compressor are relatively large. Its housing and its compressor wheel are components which are welded together from individual parts. Accordingly, such a turbo compressor is expensive. FIG. 2 is a schematic view of a mechanical compressor 49', which is based on a compressor unit, as is available in large numbers and cost-effectively in "turbochargers" of internal combustion engines. Such a mechanical compressor has a housing 75 designed as a cast metal part and a compressor wheel 77 designed as a milled part. Since the diameter of the compressor wheel of standard "turbochargers" is relatively small, it is provided for the compressor wheel 77 to be driven by at least one electric motor via a gear system 79. In the embodiment shown, the gear system 79 is designed as an epicyclic gear system, here in the form of a planetary gear system, which in the conventional manner has three gear elements interconnected by a drive, 81, 83, 85, in the form of a sun gear, a ring gear and a planet carrier for gears connected to the sun gear and the ring gear in the drive connection. The sun gear, the ring gear and the planet carrier are rotatable relative to one another in a manner in which they are coaxial with one another. While one of the gear elements, here the gear element 81, is coupled to the compressor wheel 77, each of the other two gear elements 83, 85 is coupled to a separate electric motor 87, 89, respectively. The gear element 81 is expediently the sun gear such that the speeds of the gear elements 83, 85 can be superimposed on one another additively. In this manner, the relatively high speeds described above of the compressor wheel 77 can be achieved by conventional electric motors. It should be understood that one of the two electric motors 87 or 89 can be omitted if one of the two gear elements 83 and 85, respectively, is fastened in a stationary manner to the housing 75. The mechanical compressor from FIG. 2 can be used instead of the compressor 49 of the pot still distillation system from FIG. 1. It can, however, also be used for other distillation or vaporising systems, for example, systems comprising continuously operating columns.

The invention claimed is:

1. A pot still distillation system comprising
    a distillation pot still having a base set up to heat an alcoholic liquid, and a top which removes alcoholic vapours,
    a heating device which heats the alcoholic liquid in the base and has a heat exchanger which is in thermal contact with the alcoholic liquid and is heated by water vapour, and
    a condenser which condenses alcoholic vapour supplied from the top and has a cooling water circuit which circulates cooling water across the condenser,
    wherein the cooling water circuit comprises a separator which removes water vapour from the cooling water circuit,
    and a mechanical compressor that precompresses the water vapour removed by the separator and supplies the precompressed water vapour to an intake port of a steam jet pump which is driven by water vapour from a water vapour source and post-compresses the pre-compressed water vapour, said steam jet pump supplying the post-compressed water vapour to the heat exchanger for heating the heat exchanger.

2. The pot still distillation system according to claim 1, wherein a control system is assigned to the mechanical compressor, by means of which control system the mass flow of pre-compressed water vapour can be adjusted.

3. The pot still distillation system according to claim 2, wherein the control system adjusts the speed of a drive motor of the mechanical compressor.

4. The pot still distillation system according to claim 2, wherein the control system keeps the mass vapour flow of post-compressed water vapour substantially constant.

5. The pot still distillation system according to claim 1, wherein the mechanical compressor is designed as a rotary blower or as a roots blower or as a turbo compressor.

6. The pot still distillation system according to claim 5, wherein the speed of the turbo compressor is greater than 20,000 RPM.

7. The pot still distillation system according to claim 6, wherein the turbo compressor comprises a housing, which is a cast metal housing part, and a compressor wheel, which is a milled part and driven by an electric motor via a planetary gear system.

8. The pot still distillation system according to claim 1, wherein a temperature control system is assigned to the mechanical compressor, which temperature control system keeps the temperature of the mechanical compressor within a predetermined temperature range by injecting water on the intake side of the mechanical compressor.

9. The pot still distillation system according to claim 1, wherein the mechanical compressor increases the absolute pressure of the pre-compressed water vapour relative to the absolute pressure at the separator by a factor of 2 to 3 and/or increases the temperature of the pre-compressed water vapour to more than 100° C.

10. The pot still distillation system according to claim 1, wherein the steam jet pump increases the absolute pressure of the post-compressed water vapour relative to the absolute pressure of the pre-compressed water vapour by a factor of 1.1 to 1 and/or increases the temperature of the post-compressed water vapour relative to the temperature of the pre-compressed water vapour by a factor of 1.05 to 1.3.

11. The pot still distillation system according to claim 1, wherein the alcoholic liquid is aqueous fermented wort.

* * * * *